United States Patent [19]

Spohn et al.

[11] 4,444,358

[45] Apr. 24, 1984

[54] FLUID RESERVOIR AND CONNECTOR

[76] Inventors: Daniel M. Spohn, 8451 Miller Rd., Box 28, Swartz Creek, Mich. 48473; Brian A. Snyder, 920 Copeman Blvd., Flint, Mich. 48504

[21] Appl. No.: 260,918

[22] Filed: May 6, 1981

Related U.S. Application Data

[63] Continuation-in-part of Ser. No. 113,458, Jan. 21, 1980, abandoned.

[51] Int. Cl.³ .............................................. B60S 1/50
[52] U.S. Cl. .............................. 239/284 R; 215/309; 222/385; 222/478
[58] Field of Search ............... 239/284 R, 284 A, 332, 239/333; 128/200.11; 215/1 R, 100 R, 101, 228, 307–309, 319; 222/385, 400.7, 400.8, 401, 464, 478; 220/287

[56] References Cited

U.S. PATENT DOCUMENTS

| 523,159 | 7/1894 | Bengue | 215/308 |
|---|---|---|---|
| 1,370,706 | 3/1921 | Price | 222/400.8 |
| 2,310,714 | 2/1943 | Slaughter | 222/400.7 |
| 2,533,726 | 12/1950 | Floyd | 222/400.7 X |
| 2,562,496 | 7/1951 | Kirsch | 215/100 R X |
| 2,621,830 | 12/1952 | Stow et al. | 222/400.7 X |
| 2,673,762 | 3/1954 | Doyle | 239/284 R X |
| 2,803,384 | 8/1957 | Korte et al. | 222/385 X |
| 3,028,032 | 4/1962 | Jones | 215/100 R X |
| 3,141,617 | 7/1964 | Spica | 239/284 |
| 3,163,332 | 12/1964 | Boyle et al. | 222/464 X |
| 3,212,660 | 10/1965 | Adell | 215/100 R X |
| 3,213,493 | 10/1965 | Chichester | 239/284 R X |
| 3,467,270 | 9/1969 | Eady | 215/309 |
| 3,726,443 | 4/1973 | Harris | 222/385 X |

FOREIGN PATENT DOCUMENTS 2239102  3/1975  France .................. 239/284 R

*Primary Examiner*—Johnny D. Cherry
*Attorney, Agent, or Firm*—Gifford, VanOphem, Sheridan & Sprinkle

[57] ABSTRACT

A windshield washer fluid supply comprising a bracket adapted to hold a conventional windshield washer solvent container in which the solvent is originally purchased. The invention also includes a plug which can be secured to the mouth of the solvent container which holds a tube extending into the solvent container and connected to the inlet of a fluid pump. The stopper permits use with solvent containers having different mouths and enables the container to be used with a submersible pump appropriately sized to fit within the container or used with a preexisting external fluid pump.

16 Claims, 9 Drawing Figures

U.S. Patent   Apr. 24, 1984   Sheet 2 of 2   4,444,358
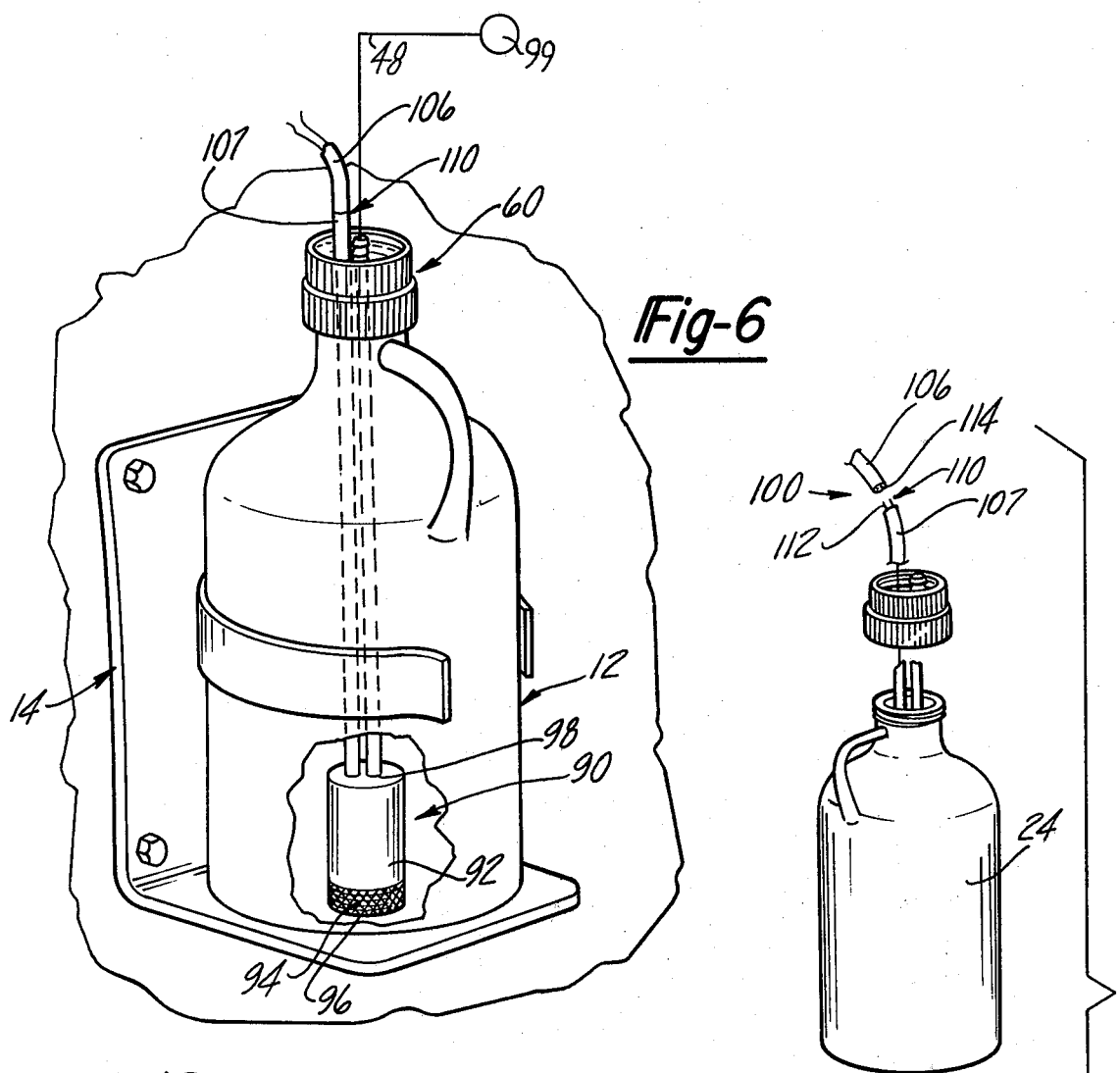
Fig-6
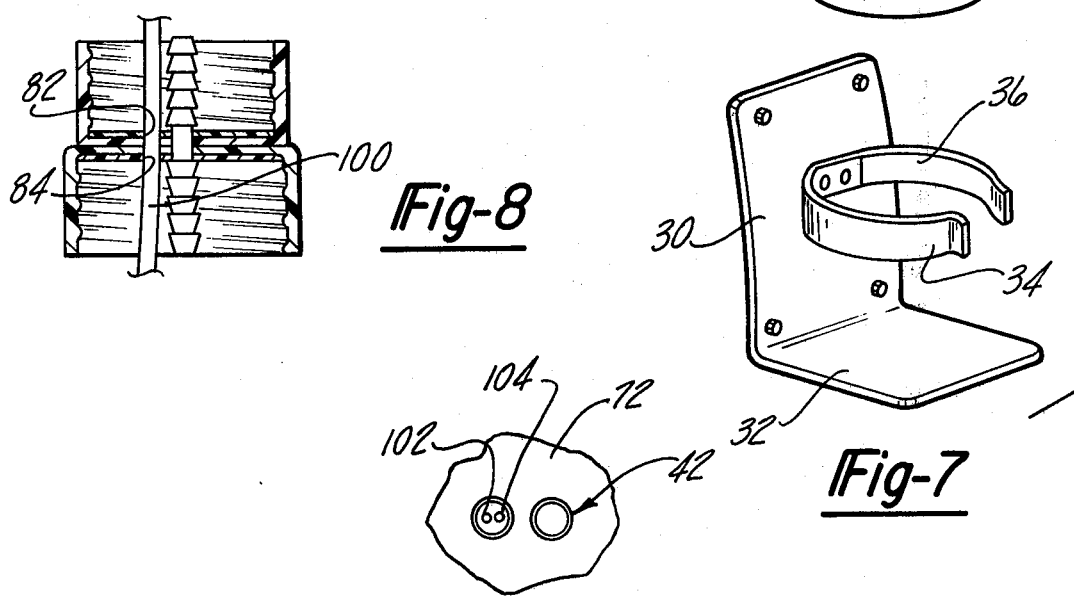
Fig-8
Fig-7
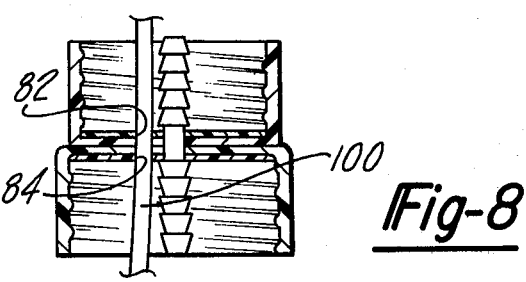
Fig-9

FLUID RESERVOIR AND CONNECTOR

CROSS REFERENCE

This application is a continuation-in-part application of Ser. No. 113,458, entitled FLUID RESERVOIR AND CONNECTOR, filed Jan. 21, 1980, now abandoned.

BACKGROUND OF THE INVENTION

I. Field of the Invention

The present invention relates generally to windshield washer fluid reservoirs and the connectors which fluidly connect the reservoir to the inlet of the fluid pump, and more particularly to such devices in which the reservoir is detachably secured within the engine compartment of a motor vehicle and in which the connector can be secured to more than one size of fluid reservoir.

II. Description of the Prior Art

Modern motor vehicles typically include a windshield washer system in which a fluid reservoir is fluidly connected to the inlet of a fluid pump. The outlet of the fluid pump is connected by appropriate conduits to nozzles that direct a stream of pressurized fluid against the windshield of the motor vehicle.

The reservoirs are usually secured within the engine compartment during the manufacture of the motor vehicle and remain stationarily secured to the vehicle. Eventually, the supply of fluid in the reservoir is depleted, and the reservoir is then refilled with fresh fluid to replenish the supply.

Windshield washer solvent is commonly available and commonly sold at retail in bottles or like containers. Of course, these containers vary widely in size and shape depending upon the particular manufacturer or distributor. Although they are typically substantially cylindrical and have a narrow neck through which the contents can be poured. Due to the relatively permanent installation of the reservoir, and the generally smaller size of the reservoir, it is necessary to pour the contents of the retail bottle into the reservoir. Such a procedure is not only time consuming, but is apt to cause spillage and waste of the fluid, especially when the container is relatively large and difficult to handle.

One type of previously-known window washer fluid reservoir which is removable is disclosed in the U.S. Pat. No. 3,213,493 to Chichester. Although the fluid reservoir of Chichester is easily removable from the motor vehicle, the holder for the reservoir is designed to hold only a particularly shaped reservoir. Thus, when a bottle of window washer solvent has been purchased, the fluid must still be emptied from the bottle and poured into the particular reservoir of Chichester.

SUMMARY OF THE PRESENT INVENTION

The present invention overcomes the above-mentioned disadvantages by providing a reservoir support bracket adapted to support a bottle or like container in which windshield washer solvent is conventionally sold. Since such containers typically have a substantially cylindrical periphery, the design of the support bracket is particularly advantageous in that it can support a wide range of bottle sizes so that the container in which the solvent is purchased, regardless of the particular brand or manufacturer, can be utilized as the reservoir for the windshield washer system. In addition, the bracket is made of a thin metal so that the bracket can be shaped to conform with the fender well panel or firewall housing of a motor vehicle and thereby provide a secure attachment within the engine compartment which is not likely to work loose by vibration.

The present invention also includes a fluid coupling which is adapted to engage at least two different size bottle mouths so that the conversion from one brand of windshield washer solvent to another can be easily and effectively accomplished.

Moreover, the fluid coupling permits the solvent container to be used with either a preexisting fluid pumping means or with an after-market fluid supply device which can be inserted into the container to form a substantially enclosed washer system. In either case, the fluid coupling preferably includes a filter to prevent clogging of the washer system by dust and other impurities.

Thus, the present invention provides a windshield washer system in which the supply of windshield washer solvent is several times greater than that commonly provided and in which the supply can be easily and rapidly replenished. The system of the present invention also eliminates the waste or spillage of solvent which often occurs when the solvent is transferred from the container in which it was purchased and to the reservoir which is usually mounted in a motor vehicle. In addition, the fluid is filtered immediately before entry into the fluid pump inlet of the washer system. Furthermore, the present invention provides these advantages regardless of the particular size of the container which holds the particular brand of washer fluid used by the vehicle owner.

BRIEF DESCRIPTION OF THE DRAWINGS

The present invention will be more clearly understood by reference to the following detailed description when read in conjunction with the accompanying drawing wherein like reference characters refer to like parts throughout the several views, and in which:

FIG. 6 is a perspective view similar to FIG. 1 but showing a modification of the windshield washer reservoir and connector of the present invention;

FIG. 7 is an exploded perspective view of the device shown in FIG. 6;

FIG. 8 is a sectional view of the fluid connector shown in FIGS. 6 and 7; and

FIG. 9 is a fragmentary sectional view of the connector shown in FIG. 8.

DETAILED DESCRIPTION OF SEVERAL PREFERRED EMBODIMENTS OF THE PRESENT INVENTION

Figure 1:
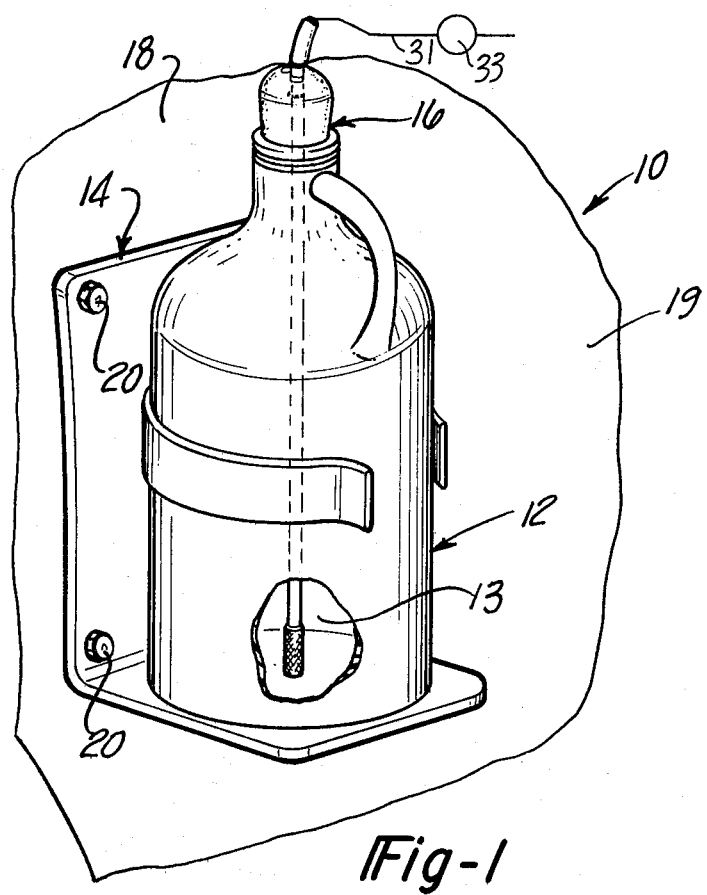
FIG. 1 is a perspective view of the windshield washer fluid reservoir and connector of the present invention.

Referring now to FIG. 1, the device 10 is thereshown and generally comprises a washer fluid reservoir 12, a support bracket 14 adapted to hold the reservoir 12, and fluid connection means 16 for fluidly connecting the interior 13 of the reservoir 12 to the inlet 31 of a fluid pump 33 shown diagrammatically of a washer system.

The support bracket 14 is secured to a wall 18 within an engine compartment 19 of a motor vehicle by appropriate means such as the pair of self-threading screws 20.

Figure 2:
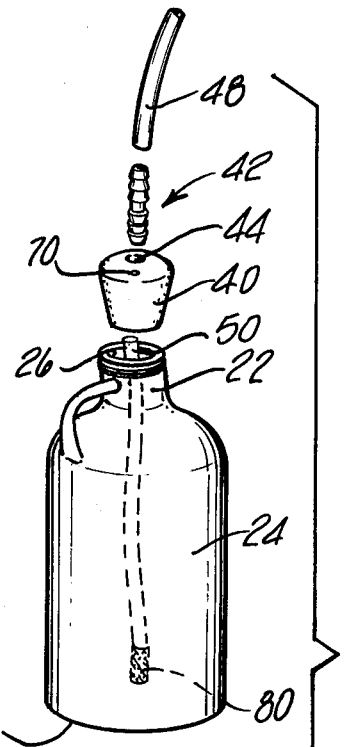
FIG. 2 is an exploded perspective view of the invention shown in FIG. 1.

Referring now to FIG. 2, the bottle 12 in the preferred embodiment is a typical one gallon jug having a neck portion 22 and an enlarged diameter main body portion 24. The neck portion 22 has an opening or mouth 26 so that the interior 13 of the main body portion 24 is open to the top of the bottle 12. However, the main body portion 24 is closed at its lowermost end by a bottom 28. As will become hereinafter apparent, the particular size of the neck portion 22 and the size of the main body portion 24 are not critical and can vary throughout a wide range of diameters. Moreover, although particular portions of the bottle 12 have been identified for the purpose of this description, the bottle 12 is a conventional container in which windshield washer fluid is typically stored and sold at retail outlets.

Still referring to FIG. 2, the support bracket 14 is thereshown comprising a thin side plate 30 perpendicularly secured at one end to one end of the substantially flat bottom plate 32. A pair of gripping arms 34 and 36 ar secured to and extend outwardly from the side plate 30 in a direction generally parallel to the bottom plate 32. As shown in FIG. 2, the gripping arms 34 and 36 are curvilinear so as to conform with the conventional shape of typically cylindrical windshield washer fluid containers. Although the arms 34 and 36 are shown in FIG. 2 as a single piece, it is only necessary that the arms 34 and 36 are spring tensioned toward each other so that they can exert a gripping force against the bottle 12. Thus, in the preferred embodiment of the present invention, the arms 34 and 36 are made of a single piece of material such as spring steel or the like which enables the arms 34 and 36 to be spring tensioned toward each other. Of course, the arms 34 and 36 could be made of separate pieces and alternative spring means used to urge the arms 34 and 36 towards each other.

Figure 3:
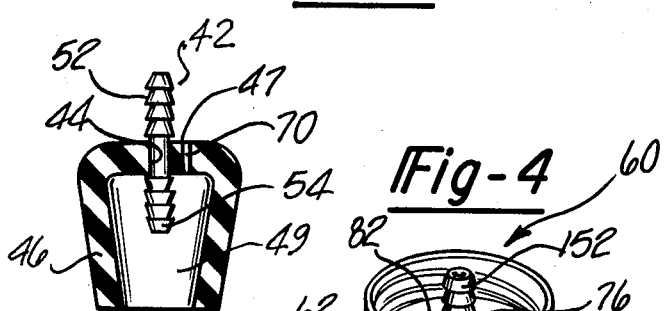
FIG. 3 is a sectional view of a fluid connector for the reservoir shown in FIGS. 1 and 2, but enlarged for clarity.

Referring now to FIGS. 2 and 3, the connector means 16 (FIG. 1) is thereshown comprising a stopper 40, a tubular coupling 42 and two elongated tubes 48 and 50. The stopper 40 comprises a frusto-conical wall portion 46 and a circular end portion 47 which together define a frusto-conical recess 49. The end portion 47 is attached to the larger diameter end of frusto-conical wall portion 46 for a reason to be hereinafter described. The end portion 47 has a first throughbore 44 through which the coupling 42 is slidably inserted. The stopper 40 is preferably made of a pliable and resilient material, such as rubber, so that although the fluid coupling 42 can be slid through the throughbore 44, the stopper 40 thereafter frictionally engages the outer periphery of the coupling 42. A vent hole 70 is formed axially through the end wall 47 of stopper 40.

The tubular coupling 42 includes a first tube engaging nipple 52 at one end and a second tube engaging nipple 54 at its other end. The coupling 42 is inserted into throughbore 44 so that nipple 52 extends outwardly from the end wall portion 47 and the nipple 54 extends into the recess 49 of stopper 40. The tube 50 is secured over the nipple 54 at one end and is sufficiently long so that its other end at least touches the bottom wall 28 of container 11. The lowermost end of the tube 50 includes a filtering screen 80 over the tube opening to prevent dust and debris from entering the coupling means 16 and thus, the washer system. The tube 48 has one end secured to the nipple 52 and is connected at its other end to the inlet of a fluid pump (not shown) by appropriate fluid coupling means.

Figure 4:
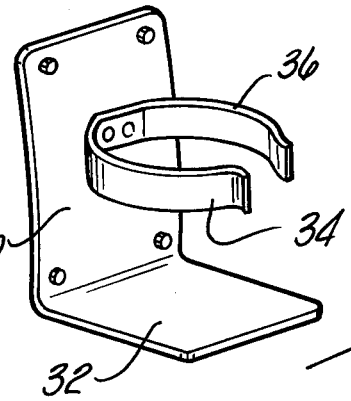
FIG. 4 is a perspective view of a modified form for the fluid connector for the reservoir.
Figure 5:
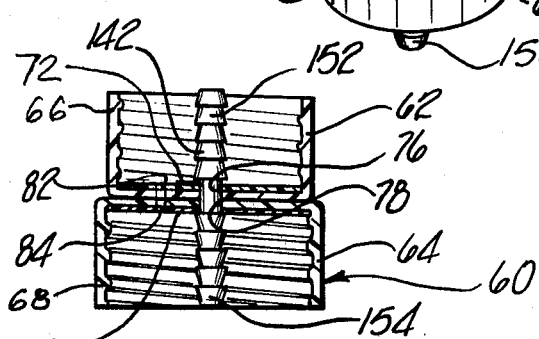
FIG. 5 is a sectional view of the connector shown in FIG. 4.

Referring now to FIGS. 4 and 5, a modification of the connector means 16 is thereshown comprising a stopper 60 having a first internally threaded cap member 62 and a second internally threaded cap member 64 having a larger diameter than the cap member 62. Each cap member 62 and 64 includes a cylindrical wall portion 66 and 68, respectively, and an end wall 72 and 74 respectively. Each end wall 72 and 74 includes a central throughbore 76 and 78 respectively. A coupling 142, substantially the same as tubular coupling 42, is inserted through the throughbores to rotatably secure the caps to the coupling 142 such that the end walls 72 and 74 are adjacent to each other. Thus, the threaded recess of each cap member 62 and 64 remains exposed and the nipples 152 and 154 of coupling 142 extend into the recesses of cap members 62 and 64, respectively. In addition, each cap member 62 and 64 includes a vent hole 82 and 84 respectively, through the end walls 72 and 74.

Unlike the stopper 40, the screw caps 62 and 64 of the stopper 60 need not be made of a rigid and resilient material, and are preferably made of a rigid material which maintains the shape of the threaded recesses to provide a tight threaded engagement between the connector means and the container 12. Of course, the use of the stopper 62 in the form shown in the drawing is limited to containers wherein the neck 22 is externally threaded. However, it is to be understood that it is within the scope of the present invention to make the cylindrical cap members 62 and 64 rigid and resilient, much like the stopper 40, so that the cylindrical walls engage the neck 22 by frictional engagement rather than threaded engagement.

Referring now to FIG. 6, the coupling member 60 is thereshown used in conjunction with a submersible pump 90. The pump 90 includes a housing 92 which is appropriately dimensioned to be insertable through the neck 22. As shown, the pump includes a fluid inlet 94 at its lowermost end. Preferably, the inlet 94 is covered by a filter element 96 to block the flow of impurities through the pump and toward the nozzles 99 (shown diagrammatically). The housing 92 also includes a fluid outlet at the end opposite to the inlet 94. The tube 50 which is attached at one end to a coupling member 42 is fluidly connected at its other end to the fluid outlet 98. Preferably, the tube 50 is long enough to permit the inlet 94 of the pump 90 to be maintained in a position at the bottom of the container 12.

An insulated twin lead cable 100 also extends outwardly from the top of the pump housing 92 toward the connector 60. As best shown in FIG. 8, the cable is slidably received through the apertures 82 and 84 in the connector 60. The cable 100 includes a pair of conductors 102 and 104 (See FIG. 9) which connect the positive and negative terminals (not shown) of the fluid pump 90 to an electrical power source such as a battery (not shown). For ease in installation, the cable 100 is preferably formed of two elongated portions 106 and 107 which are interconnected by a plug and socket connection 110. As best shown in FIG. 7, the plug 112 can be removed from the socket 114 so that the connector 60 can be easily screwed on the neck 22 of the container 12 without entangling or twisting cable 100 during installation of the connector 60. Although the use of a submersible pump 90 has been described with respect to the connector 60, it is to be understood that a stopper 40 or the like is equally adaptable for use with such a pump and is equally within the scope of the present invention.

Having thus defined the particular components of the devices shown in the drawing, the operation of the devices will now be described. The bracket 14 is first secured to the motor vehicle by securing the side plate 30 to a wall within the engine compartment 19 of the motor vehicle. This can easily be done by first removing the original equipment reservoir and replacing it with the bracket 14 by utilizing the same fastening means. Alternatively, the bracket 14 can be installed as original equipment during the manufacture of the motor vehicle. In either case, it is only necessary to mount the bracket in a position within the vehicle engine compartment 19 such that the container 12 can be easily inserted and removed from the bracket 14.

However, in the event that the fastening means for the original equipment reservoir is not adapted to hold the bracket of the present invention, or in the event that the position of the original equipment reservoir does not permit easy insertion and removal of the new reservoir from the bracket 14, it is an important feature of the present invention that the side plate 30 of the bracket 14 can bend to conform with the contour of body panels within the engine compartment so that the container can be securely fastened within the engine compartment in a position which permits easy insertion and removal of the container from the bracket 14. This bending or deformation of the bracket 14 is only limited to the extent that the bottom wall 32 must extend outwardly from the side wall 30 so that it remains in registration with the space between the arms 34 and 36 in order to support the bottom of the container 12 and prevent it from sliding through the arms 34 and 36. Therefore, it is within the scope of the present invention that the alignment of the arms 34 and 36 with respect to the side wall 30 is adjustable so that the plane of extension of the arms 34 and 36 is substantially parallel to the bottom wall 32 of the bracket 14.

The connector means 16 is then assembled and secured to the container 12. With regard to the use of the stopper 40 shown in FIGS. 1-3, the coupling member 42 is inserted through the bore 44 of the stop member 40 so that the nipple extends downwardly into the recess 49. One end of the tube 50 is then urged over the nipple 54 to provide a fluid connection between the coupling 42 and the interior of the container 12. The opposite end of the tube 50 preferably extends to the bottom 28 of the container 12 so that regardless of the level of fluid within the container, fluid communication is established between the fluid contents and the coupling 42. In addition, the tube 50 preferably includes a screen or filter 80 so that dust and other impurities cannot flow through the connector means 16 and into the wash system.

One end of the tube 48 is urged over the exposed nipple 52 and the other end of the tube 48 is secured by an appropriate fluid connector to the inlet of a fluid pump. Necessarily, the length of the tube 48 is dependent upon the position of the bracket 14 with respect to the fluid pump secured within the engine housing.

The stopper 40 is then secured to the top of the bottle 12 by pushing the frusto-conical portion 46 of the stopper 40 into the mouth 26 of the bottle 12. Since the wall 46 is pliable and resilient, its periphery is tightly wedged against the inner wall of neck 22, while the tubular coupling 42 remains undeformed and permits the free flow of fluid therethrough. The tube 48 is then connected at one end to the inlet of the fluid pump (not shown) by appropriate conduits (not shown) and the other end is secured over the nipple 52.

Alternatively, the frusto-conical wall portion 46 can be stretched and urged over the outer periphery of the neck 22 of the bottle 12. The recess 49 is appropriately sized so as to provide a tight sealing engagement between the periphery of the recess 49 and the outer periphery of the neck 22. Preferably, the range of cross-sectional diameters of the frusto-conical recess 49 is different from the range of cross-sectional diameters of the outer periphery of the wall 46 throughout the frusto-conical portion 46 so that the plug 40 can be used with either of at least two solvent containers having substantially different neck and mouth sizes. Moreover, the frusto-conical shape of the inner and outer periphery of the wall 46 of the stopper 40 enables each periphery to engage a variety of solvent containers having substantially different neck and mouth sizes. Such a stopper is particularly advantageous in that, although there are a large number of manufacturers of windshield washer solvent who utilize containers of various sizes having different neck sizes to distinguish their products from the products of others, the stopper 40 can be used with substantially all of these containers.

Substitution of the stopper member 60 shown in FIGS. 4 and 5 for the stopper member 40 likewise provides the fluid connector means 16 which can be securely fastened to the neck of the fluid container 12 and which permits free flow of the fluid through the connector means. The nipples 152 and 154 are preferably the same size so that tube 48 and tube 50 can be interchanged depending upon the particular cap 62 or 64 used to engage the neck 22. Although each screw cap portion 62 and 64 shown in the drawing is strictly limited to threaded engagement of the corresponding threaded neck 22, such structurable limitations do not unduly restrict the use of such a connector since windshield washer solvent containers are typically provided with screw caps in standard sizes. Consequently, preselected sizes of cap members which correspond with the threaded necks of the most commonly available windshield washer solvent containers, are widely available and can be easily modified according to the teachings of the present invention to form the cap members 62 and 64.

In the preferred form of the stopper 60, the end walls 72 and 74 are separated slightly by projections extending outwardly from the facing surfaces of the end walls so that the vent holes 82 and 84 are not obstructed and can provide free fluid communication between the interior of the container 12 and the ambient air when one end of the stopper 60 is connected to the container 12. Alternatively, it is understood that the cap members 62 and 64 need not be separately rotatable and the end walls 72 and 74 need not be separated if the vent hole 82 remains in constant communication with the vent hole 84 (see FIG. 5) by means of a sleeve or the like.

On the other hand, when the original equipment pump is to be replaced by the submersible pump 90, the apertures 82 and 84 can be appropriately sized to loosely receive the cable 100 therethrough. In this case, the cable 100 also serves to align the apertures 82 and 84 so that the apertures act as a vent and to allow free flow of the fluid through the pump and toward the spray nozzles mounted in front of the windshield. Nevertheless, it will be understood that when the submersible pump 90 is used, the present invention provides a compact windshield washer solvent supply which does not occupy a large portion of the engine compartment as when the components are separated and secured in separate areas of the engine compartment. Moreover, no separate connection is necessary to provide support for the fluid pump or to secure it within the engine compartment of the vehicle.

In any case, regardless of the particular stopper or stopper portion used to secure the tubular coupling 42 to the container 12, when the supply of fluid within the solvent container is depleted, the connection means can be easily removed from the container and the container rapidly removed from the bracket 14. A bottle of fresh fluid can then easily be inserted in the bracket and fluidly connected to a fluid pump by the same equipment regardless of the brand of solvent purchased and the size of the container utilized by the manufacturer of the brand purchased. Thus, the present invention provides a window washer fluid supply system which is easily replenished by substituting any commonly available windshield washer fluid in the container in which it is purchased for the previously used and now depleted supply of windshield washer fluid. In addition, the present invention avoids the loss and waste of windshield washer fluid which commonly occurs when the motorist is pouring fluid from the container in which the wash fluid was purchased into the conventional permanently mounted fluid reservoirs.

Having thus described my invention, many modifications will become apparent to those skilled in the art to which it pertains without departing from the spirit and the scope of the appended claims.

What is claimed is:

1. A windshield washer solvent supply for vehicles having an engine compartment, a washer fluid pump having an inlet and an outlet, and a conduit directed to expel fluid toward the windshield, said supply comprising:
    a washer fluid reservoir wherein said reservoir is a container in which the washer fluid is readily purchased at wholesale or retail and includes a cylindrical neck with a diameter substantially equal to one of at least two diameters;
    a support bracket having means for releasably securing said container to said bracket;
    means for securing said bracket to a wall in the engine compartment of the vehicle;
    a connector means for fluidly connecting the interior of the container with the pump inlet, said connector means having a first neck engaging means and a second neck engaging means, wherein said first neck engaging means is appropriately dimensioned to securely engage said neck having said one diameter, and wherein said second neck engaging means is appropriately dimensioned to securely engage a neck having at least another of said at least two diameters;
    wherein said connector means comprises at least one tubular wall portion and a circular wall portion substantially closing one end of each said at least one tubular wall portion, said circular wall portion having a first throughbore and a second throughbore;
    a tubular coupling inserted through said first throughbore;
    a first conduit member connected at one end to one end of said tubular coupling and at its other end connected to said pump inlet; and
    a second conduit member connected at one end to the other end of said tubular coupling and having its other end in fluid communication with the interior of said fluid container near the bottom of said container.

2. The invention as defined in claim 1 wherein said other end of said second conduit member includes a filter element.

3. The invention as defined in claim 1 wherein said at least one tubular wall portion is a single one, and said second neck engaging means comprises the inner periphery of the same tubular wall portion.

4. The invention as defined in claim 1 wherein said tubular wall portion is frusto-conical.

5. The invention as defined in claim 1 wherein said tubular coupling includes a first nipple at one end and a second nipple at its other end.

6. The invention as defined in claim 1 wherein said bracket is made of a thin sheet of metal which can be bent to conform with the configuration of said engine compartment.

7. The invention as defined in claim 1 wherein said container is of standard volume.

8. The invention as defined in claim 1 wherein said bracket comprises:
    a floor plate;
    a wall plate secured at one end to an end of said floor plate; and
    means for gripping said container comprising a pair of spaced apart resilient arms secured to the wall plate and including spring tension means for urging said arms toward each other so as to grip and hold said container therebetween.

9. A windshield washer solvent supply for vehicles having an engine compartment, a washer fluid pump having an inlet and an outlet, and a conduit directed to expel fluid toward the windshield, said supply comprising:
    a washer fluid reservoir wherein said reservoir is a container in which the washer fluid is readily purchased at wholesale or retail and includes a cylindrical neck with a diameter substantially equal to one of at least two diameters;
    a support bracket having means for releasably securing said container to said bracket;
    means for securing said bracket to a wall in the engine compartment of the vehicle;
    a connector means for fluidly connecting the interior of the container with the pump inlet, said connector means having a first neck engaging means and a second neck engaging means, wherein said first neck engaging means is appropriately dimensioned to securely engage said neck having said one diameter, and wherein said second neck engaging means is appropriately dimensioned to securely engage a neck having at least another of said at least two diameters;
    wherein said connector means comprises at least one tubular wall portion and a circular wall portion substantially closing one end of each said at least one tubular wall portion, said circular wall portion having a first throughbore and a second throughbore;
    a tubular coupling inserted through said first throughbore;
    a first conduit member connected at one end to one end of said tubular coupling and at its other end connected to said pump inlet;

a second conduit member connected at one end to the other end of said tubular coupling and having its other end in fluid communication with the interior of said fluid container near the bottom of said container;

wherein said first neck engaging means comprises said at least one tubular wall portion comprising first and second tubular wall portions, said first tubular wall portion being cylindrical and having a threaded inner periphery;

said second tubular wall portion being cylindrical and having a threaded inner periphery; and wherein said circular end walls of each first and second tubular wall portions are placed adjacent each other with said tubular coupling inserted through said first throughbore of each said circular end wall.

10. A windshield washer solvent supply for vehicles having spray nozzles directed to expel solvent towards said windshield comprising:

a reservoir which is a container in which the washer fluid is readily purchased at wholesale or retail and includes a cylindrical neck with a diameter substantially equal to one of at least two diameters, said supply further comprising a support bracket having means for releasably securing said container to said bracket;

means for securing said bracket to a wall in the engine compartment of the vehicle;

a submersible electric fluid pump having a housing with a fluid inlet and a fluid outlet, said housing being dimensioned to be insertable through the neck of said container;

a connector means for fluidly connecting the interior of the container with the nozzles, said connector means having a first neck engaging means and a second neck engaging means, wherein said first neck engaging means is appropriately dimensioned to securely engage said neck having said one diameter, and wherein said second neck engaging means is appropriately dimensioned to securely engage a neck having at least another of said at least two diameters;

and further wherein said connector means comprises at least one tubular portion and a circular wall portion substantially closing one end of each said at least one tubular wall portion, said circular wall portion having a first throughbore and a second throughbore;

a tubular coupling inserted through said first throughbore;

a first conduit member connected at one end to one end of said tubular coupling and at its other end connected to said pump outlet;

a second conduit member connected at one end to the other end of said tubular coupling and having its other end in fluid communication with said nozzles;

electrical conductor means for electrically connecting said pump to an electric power source;

wherein said first neck engaging means comprises said at least one tubular wall portion comprising first and second tubular wall portions, said first tubular wall portion being cylindrical and having a threaded inner periphery;

said second tubular portion being cylindrical and having a threaded inner periphery; and wherein said circular end walls of each first and second tubular wall portion are placed adjacent each other with said tubular coupling inserted through said first throughbore of each said circular end wall.

11. The invention as defined in claim 10 wherein said electrical conductor means is an insulated, twin lead wire, said wire extending through said second throughbore in said circular wall portions.

12. A windshield washer solvent supply for vehicles having spray nozzles directed to expel solvent towards said windshield comprising;

a reservoir which is a container in which the washer fluid is readily purchased at wholesale or retail and includes a cylindrical neck with a diameter substantially equal to one of at least two diameters, said supply further comprising a support bracket having means for releasably securing said container to said bracket;

means for securing said bracket to a wall in the engine compartment of the vehicle;

a submersible electric fluid pump having a housing with a fluid inlet and a fluid outlet, said housing being dimensioned to be insertable through the neck of said container;

a connector means for fluidly connecting the interior of the container with the nozzles, said connector means having a first neck engaging means and a second neck engaging means, wherein said first neck engaging means is appropriately dimensioned to securely engage said neck having said one diameter, and wherein said second neck engaging means is appropriately dimensioned to securely engage a neck having at least another of said at least two diameters;

and further wherein said connector means comprises at least one tubular portion and a circular wall portion substantially closing one end of each said at least one tubular wall portion, said circular wall portion having a first throughbore and a second throughbore;

a tubular coupling inserted through said first throughbore;

a first conduit member connected at one end to one end of said tubular coupling and at its other end connected to said pump outlet;

a second conduit member connected at one end to the other end of said tubular coupling and having its other end in fluid communication with said nozzles; and electrical conductor means for electrically connecting said pump to an electric power source.

13. The invention as defined in claim 12 wherein said electrical conductor means extends through said second throughbore.

14. The invention as defined in claim 12 wherein said pump inlet includes a filter element.

15. The invention as defined in claim 12 wherein said first conduit member is elongated, having a length substantially the same as the height of said container, whereby said pump and said pump inlet are disposed at the bottom of said container.

16. The invention as defined in claim 12 wherein said tubular portion is frusto-conical.

* * * * *